(12) United States Patent
Heise et al.

(10) Patent No.: US 12,184,788 B2
(45) Date of Patent: Dec. 31, 2024

(54) SMART METER AND METHOD FOR THE RELIABLE PROVISION OF MEASUREMENT DATA IN A DECENTRALIZED TRANSACTION DATABASE

(71) Applicant: Robert Bosch GmbH, Stuttgart (DE)

(72) Inventors: Christian Heise, Aachen (DE); Jared Weinfurtner, Weilheim an der Teck (DE)

(73) Assignee: ROBERT BOSCH GMBH, Stuttgart (DE)

( * ) Notice: Subject to any disclaimer, the term of this patent is extended or adjusted under 35 U.S.C. 154(b) by 304 days.

(21) Appl. No.: 17/456,929

(22) Filed: Nov. 30, 2021

(65) Prior Publication Data

US 2022/0173912 A1 Jun. 2, 2022

(30) Foreign Application Priority Data

Dec. 1, 2020 (DE) ...................... 10 2020 215 135.0

(51) Int. Cl.
*H04L 9/32* (2006.01)
*G06F 16/23* (2019.01)

(52) U.S. Cl.
CPC ........ *H04L 9/3247* (2013.01); *G06F 16/2379* (2019.01)

(58) Field of Classification Search
CPC ........................... H04L 9/3247; G06F 16/2379
USPC ........................................................... 713/176
See application file for complete search history.

(56) References Cited

U.S. PATENT DOCUMENTS

| | | | | |
|---|---|---|---|---|
| 2019/0190719 A1* | 6/2019 | van de Ruit | .......... | H04L 9/3239 |
| 2019/0294822 A1* | 9/2019 | Hennebert | ............ | G06F 21/602 |
| 2019/0323858 A1* | 10/2019 | Wilkinson | ................ | H04L 9/50 |
| 2020/0134209 A1* | 4/2020 | Zhang | ....................... | H04L 9/50 |
| 2020/0136832 A1* | 4/2020 | Li | ......................... | G06F 21/645 |
| 2021/0258880 A1* | 8/2021 | Liu | ........................ | H04W 24/10 |
| 2021/0326880 A1* | 10/2021 | Yang | .................... | H04L 63/0428 |
| 2022/0303125 A1* | 9/2022 | Enkhtaivan | ........... | H04L 9/3242 |
| 2022/0383055 A1* | 12/2022 | Kobayashi | ......... | G06F 18/24143 |

FOREIGN PATENT DOCUMENTS

| | | |
|---|---|---|
| DE | 102017117598 A1 | 2/2019 |
| DE | 102017122227 A1 | 3/2019 |
| EP | 3300206 A1 | 3/2018 |

* cited by examiner

*Primary Examiner* — Thanh T Le
(74) *Attorney, Agent, or Firm* — NORTON ROSE FULBRIGHT US LLP; Gerard A. Messina

(57) ABSTRACT

A method for the reliable provision of measurement data of at least one sensor of a smart meter in a decentralized transaction database. The method includes forming a measurement data set, which comprises measurement data recorded by the at least one sensor at least at one point in time, the meter digitally signing the measurement data set using a secret key; the meter transmitting the digitally signed measurement data set to a first protocol, which is implemented as a computer protocol executed in automated fashion on the transaction database, the verification protocol verifying the digitally signed measurement data set using a public key, which corresponds to the secret key; and, if the measurement data set is successfully verified, providing the measurement data set to at least one second protocol, which is implemented as a computer protocol executed in automated fashion on the transaction database.

11 Claims, 2 Drawing Sheets

SMART METER AND METHOD FOR THE RELIABLE PROVISION OF MEASUREMENT DATA IN A DECENTRALIZED TRANSACTION DATABASE

The present invention relates to a method for the reliable provision of measurement data of at least one sensor of an intelligent meter (so-called smart meter) in a decentralized transaction database as well as to a smart meter and to a computer program for implementation thereof.

BACKGROUND INFORMATION

"Smart meters", also called intelligent meters or intelligent measuring systems, are measuring devices (e.g., electric meters) which record measurement data (e.g., power consumption or generation) and transmit said data via a network usually to a metering point operator and possibly to so-called "smart home" applications (intelligent home technology). Additionally, such meters can receive data, such as rate changes. The Federal Office for Information Security (Bundesamt für Sicherheit und Informationstechnik (BSI)) sets specifications for securing the communication in today's network infrastructure. These specifications also relate particularly to the responsibility of the network point operator for the correct operation of meters and the correct reporting of the metering point data to the network operator, e.g., to an electric utility provider. Thus, the network point operator responsible for the compliance with the specifications has a crucial position.

In a decentralized supply network (e.g., for electricity, gas, or water), measurement data (for example consumption and generation data) must be transmitted to a "smart contract". "Smart contracts" are known in the context of "distributed ledger technologies (DLT)". Within the framework of DLT,decentralized transaction databases are used (for example a blockchain) in which smart contracts are stored and transactions triggered automatically by these smart contracts are recorded (for example by a chain of transaction blocks cryptographically secured via hash values).

A central hub ensuring the reliability of transmitted data does not exist in such decentralized supply networks. In a decentralized supply network, the integrity of the data transmitted to "smart contracts" must be ensured without requiring a trusted entity (metering point operator) to accept responsibility for the integrity of the data.

SUMMARY

According to the present invention, a method is provided for the reliable provision of measurement data of at least one sensor of a smart meter in a decentralized transaction database as well as a smart meter and a computer program for the implementation of the method. Advantageous embodiments of the present invention are disclosed herein.

In accordance with an example embodiment of the present invention, the method for the reliable provision of measurement data of at least one sensor of a smart meter in a decentralized transaction database comprises: forming a measurement data set, comprising measurement data recorded by at least one sensor at least at one point in time; digital signing of the measurement data set by the meter using a secret key; transmitting the digitally signed measurement data set by the meter to a first protocol implemented as a computer protocol executed on the transaction database in an automated fashion; verifying the digitally signed measurement data set by the verification protocol using a public key, which corresponds to the secret key; and, upon successful verification of the measurement data set, providing the measurement data set to at least one second protocol implemented as a computer protocol executed on the transaction database in automated fashion.

According to the present invention it may be achieved that the measurement data (for example consumption and generation data) recorded and transmitted by the smart meter may be unambiguously allocated to a metering point and thus to a network connection point, and may be securely provided or transmitted to protocols or smart contract units in a decentralized transaction database of a decentralized supply network.

In principle, smart contracts may be regarded as computer protocols or computer programs which represent a contract and particularly allow in automated fashion for the processing of and compliance with a contract. Such computer protocols ("smart contract") may be implemented by a programming language in a decentralized database, for example a blockchain. For this purpose, the programming language Solidity may be used for example, which was developed specifically for the implementation of these computer protocols and is used, e.g., in Ethereum and in the "Ethereum Virtual Machine". In the case of a smart electric meter, a protocol may pertain for example to the invoicing of electricity supplies rendered.

In the present application, the term "protocol" is used for "smart contract". A protocol is therefore implemented as a computer protocol or computer program, which is executed in an automated fashion. A protocol generally comprises program codes and/or data, which are stored in the transaction database.

Protocols are executed automatically, that is, they do not need to be called up specifically, i.e., the processes codified in the program code are executed automatically, for example in response to specific given conditions. Data may be generated or data may be modified during the execution of a protocol or program code, which are stored by the transaction database in the form of transactions (e.g., in blocks of a blockchain). A protocol is thus implemented as a computer protocol executed automatically on the transaction database. The transaction database may be implemented as a blockchain.

In accordance with an example embodiment of the present invention, an asymmetrical method is used for the digital signature, which thus uses a pair of keys comprising a secret and a public key (which were jointly generated as a pair). The secret key is here stored in the meter and is ideally known only to this entity. For example, RSA (named after Rivest, Shamir, and Adleman) or DSA (Digital Signature Algorithm) may be used as digital signature methods.

In accordance with an example embodiment of the present invention, the method preferably comprises the storing of the measurement data set in the transaction database by a register protocol, which is one of at least one second protocol. Thus, the measurement data may be stored permanently and checked at later points in time.

In accordance with an example embodiment of the present invention, the method preferably comprises a retrieval of measurement data contained in the measurement data set by one or multiple third protocols, which are implemented as computer protocols executed automatically on the transaction database; it being further preferred that, if applicable, the register protocol implements a retrieval function, which is called up by the one or the multiple third protocols and upon being called up returns measurement data stored in the measurement data set. This allows particularly for the provision of stored measurement data or of subsets thereof to any other (third) protocols.

In accordance with an example embodiment of the present invention, the method preferably comprises furthermore a transmission of data and/or instructions by the first protocol to the meter, a reception of the data and/or instructions by the meter, and an implementation of settings based on the data and/or implementation of the instructions by the meter. The protocol is thus able, for example, to modify settings at the smart meter or to retrieve measurement data.

It is preferred that a secure runtime environment is provided in the meter, in which the measurement data set is formed and digitally signed. This makes it possible to prevent a manipulation of measurement data in the meter.

A smart meter according to an example embodiment of the present invention comprises at least one sensor and one processing unit, the at least one sensor being configured to record measurement data, and the processing unit being configured to form a measurement data set, which comprises measurement data recorded by the at least one sensor at least at one point of time, digitally signing the measurement data set using a private key, and transmitting the signed measurement data set to a first protocol implemented as a computer protocol automatically executed on the transaction database. The processing unit according to the present invention, e.g., a processing unit in a smart meter or a gateway for transmitting measurement data recorded by sensors, is therefore configured, particularly by way of program technology, to carry out a method of the present invention or substeps thereof.

The processing unit is preferably further configured to provide a secure runtime environment in which the steps are executed for the execution of which the processing unit is configured. It is thus possible to secure the execution of the steps against manipulations.

The smart meter is preferably configured to receive data and/or instructions from the first protocol, the processing unit furthermore being configured to implement settings based on the data and/or to execute the instructions.

In accordance with an example embodiment of the present invention, the computer program according to the present invention invention prompts a processing unit to form a measurement data set, which comprises measurement data recorded by at least one sensor at least at one point of time, to digitally sign the measurement data set using a private key, and to send the signed measurement data set to a first protocol, which is implemented as a computer protocol executed automatically on the transaction database, and preferably to implement settings based on the data received from the first protocol and/or to execute instructions received from the first protocol.

The implementation of a method according to the present invention in the form of a computer program or computer program product having program code for executing all method steps is also advantageous because this incurs particularly low costs, especially when an executing control device is also used for other tasks and therefore already exists. Suitable data carriers for providing the computer program are particularly magnetic, optical, and electric storage devices, such as hard drives, flash memories, EEPROMs, DVDs, and the like. It is also possible to download a program via computer networks (internet, intranet, etc.).

Additional advantages and embodiments of the present invention are discernible from the description and the figures.

The present invention is shown in the figures schematically based on exemplary embodiments and is described hereinafter with reference to the figures.

DETAILED DESCRIPTION OF EXAMPLE EMBODIMENTS

Figure 1:
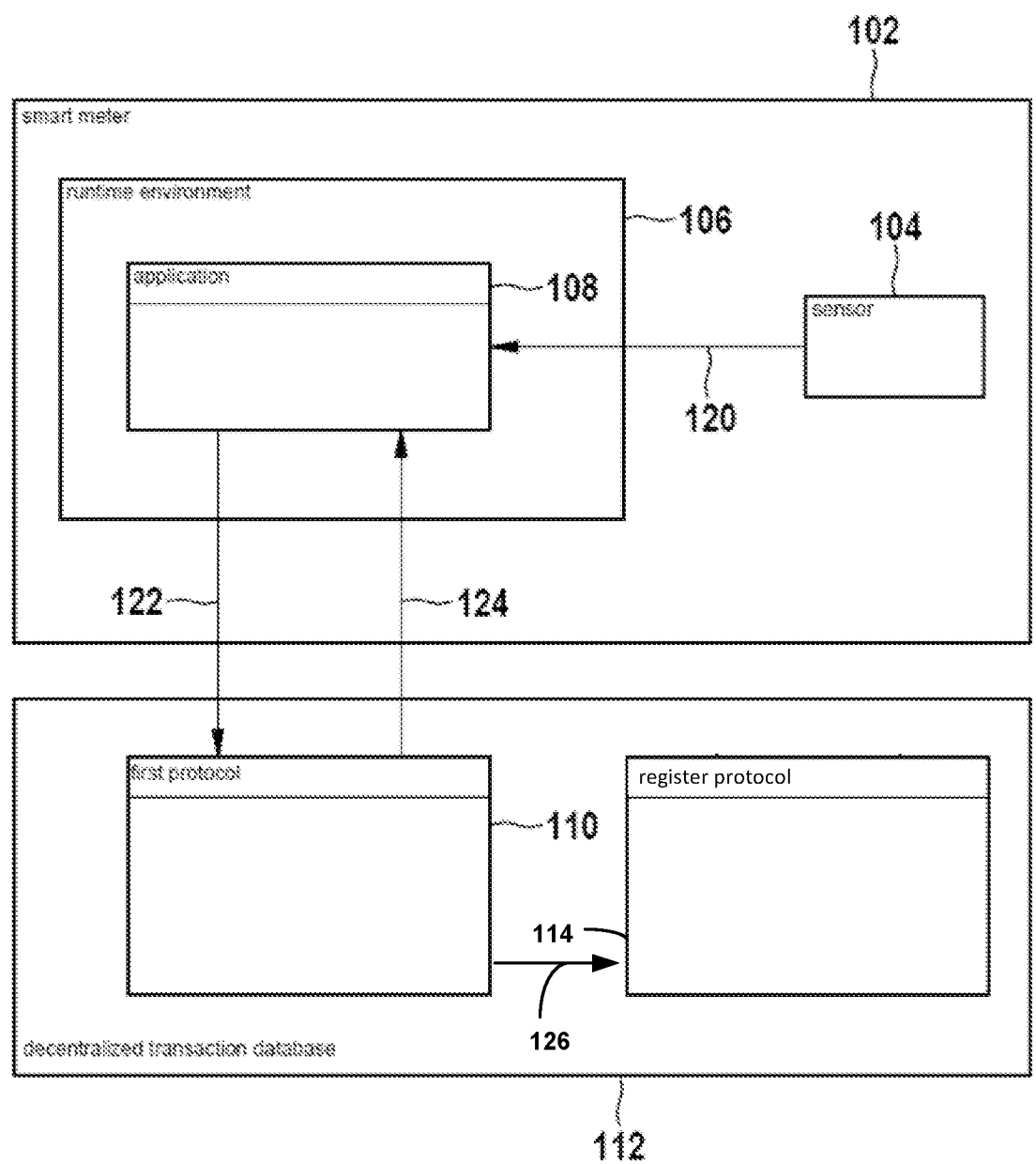
FIG. 1 shows the sequence according to a preferred specific embodiment of the method according to the present invention and the corresponding structure of the units involved.

FIG. 1 depicts the sequence according to a preferred specific embodiment of the method according to the present invention and the corresponding structure of the units involved. The smart meter 102 comprises a sensor 104, which records measurement data, and a secure runtime environment 106 for an application 108, which is implemented or executed by a processing unit comprised in the meter. The processing unit, not shown in greater detail, may comprise e.g. a processor and a storage device, the application being a computer program executed by the processor. The secure runtime environment 106 provides a reliable environment for the execution of the application 108. The runtime environment 106 may comprise both hardware components (e.g., a so-called "trusted platform module") as well as software components (i.e. a computer program executed in the processor). Sensor 104 is connected to the runtime environment 106 such that measurement data may be transmitted, it being possible for this connection or transmission to occur in a wired or wireless fashion. In general, the smart meter may comprise several sensors. Sensors may be used for example for measuring a temperature, a pressure, a water consumption, an energy consumption, an energy generation, a power consumption, a power generation, or the like.

Measurement data recorded by the sensor 104 are transmitted (arrow 120) to the application 108, which is executed in the secure runtime environment 106. The measurement data of one or more points in time are combined by the application 108 to form a measurement data set and the measurement data set is digitally signed by the application 108. An asymmetric cryptographic method is used as the digital signature method. Thus, a key pair composed of a secret or private key (signature key) and a corresponding public key (verification key) is used, a value being calculated using the secret key for a message or for data (here: the measurement data set) and the integrity of the message or the data being verified with the aid of the public key based on said value, i.e. the integrity and the origin of the message/data is checked. The secret/private key is stored by the smart meter in the runtime environment and is used for the digital signing of the measurement data set.

The digitally signed database with the measurement data is sent or transmitted by the application 108 to a first protocol 110 (arrow 122). The first protocol 110 is for example realized in a decentralized transaction database 112, particularly in a blockchain, for example in Ethereum, Solidity being used for example as the programming language. An automated schedule is implemented in the first protocol 110, which is able to execute transactions within the transaction database, i.e. the first protocol is implemented as a computer protocol executed in automated fashion on the transaction database. The first and the further protocols introduced below may be regarded as so-called "smart contracts".

The reliability of the data and of the measurement data set may be verified by the first protocol 110 based on the digital signature, i.e. by executing the computer program implementing the protocol, the first protocol using the public key for this purpose. The source and the integrity of the measurement data are thus ensured and the data may be provided by the first protocol 110 to at least one second protocol (which is again implemented as a computer protocol executed in automated on the transaction database), which based on the measurement data is able to execute predetermined processes or actions. Such a second protocol could for example implement a power supply contract between an energy provider and a customer, the sensor measuring the power consumption of the customer and the second protocol charging in automated fashion a corresponding price.

Preferably, a register protocol 114 is provided (implemented as a computer protocol executed on the transaction database in automated fashion), which is one of the second protocols. This register protocol 114 receives (arrow 126) the verified measurement data set from the first protocol and is configured (i.e. it comprises an appropriate schedule or a computer program automatically implementing it) to store it in the transaction database. Furthermore, the register protocol 114 may provide a retrieval function, which may be called up by other, third protocols (which again are implemented as computer protocols executed in an automated fashion on the transaction database) in order to obtain measurement data, i.e. the register protocol transmits stored measurement data to a calling third protocol. Here, of course call-up parameters may be provided in the retrieval function, which allow a calling third protocol to retrieve specific measurement data, e.g., measurement data within a defined time period. It is these third protocols, which are then able to perform predetermined processes or actions, based on the measurement data. The aforementioned example of a power supply contract would therefore be a third protocol. The register protocol, i.e. its functionality, may however (unlike the example shown in FIG. 1) be included already in the first protocol.

It is further possible to transmit data and/or instructions from the first protocol 110 to the smart meter 102 or the application 108 (arrow 124). They can then be received by the application 108 and evaluated or, if they include instructions, executed. Examples of such data and/or instructions are "firmware update available", "transmit new measurement data set" or "in the future use a different protocol, to which the measurement data sets are transmitted" (i.e. "use a different protocol than the first protocol"); for example, such data may represent information as to where the firmware update is available or which different protocol shall be used. The data may also relate to the settings of the meter.

Figure 2:
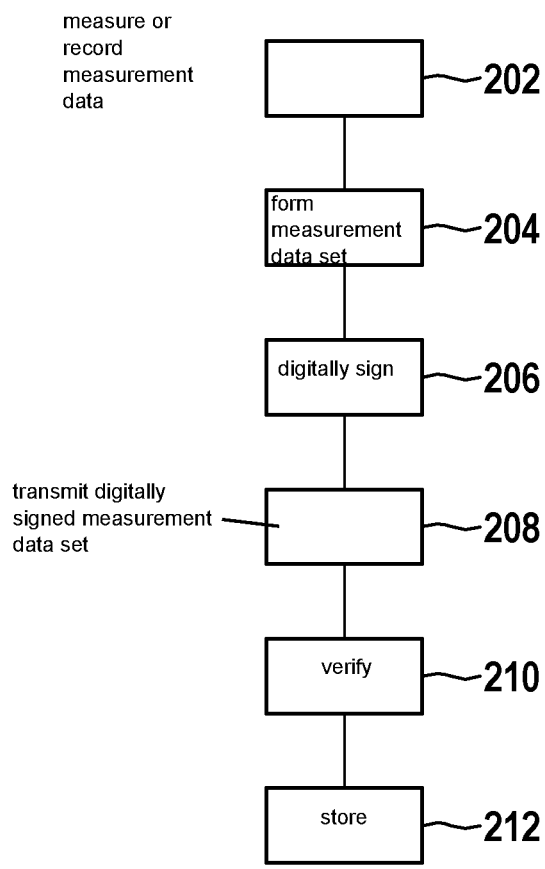
FIG. 2 shows a flow chart according to a preferred specific embodiment of the method of the present invention.

FIG. 2 shows the flow chart depicting the sequence of the method according to an exemplary embodiment of the present invention. In step 202 the measurement data are measured or recorded by at least one sensor. The measurement data may be recorded regularly, for example, in order to create a time series of measurement data. The measurements are transmitted by the sensor to the runtime environment or the application executed therein, and may also be stored there permanently or temporarily.

From measurement data that were detected at least at one point of time, a measurement data set is formed in step 204, comprising these measurement data. Preferably, the measurement data of several points in time, for example within a certain time period, are combined in order to form a measurement data set.

In step 206, the measurement data set formed is digitally signed with the use of the secret key and optionally encrypted, for example via a different secret encryption key using a symmetric encryption method. Based on the signature it is possible to unambiguously determine the source of the measurement data set and to verify its integrity.

In step 208 the digitally signed (and possibly encrypted) measurement data set is sent or transmitted to the first protocol. Using the public key (which together with the secret key forms a key pair), the first protocol is able to determine, on the basis of the signature, the integrity of the measurement data set unambiguously, i.e., verify the digital measurement data set 210, and provide the measurement data set to second protocols, particularly to the register protocol.

In a preferred step 212, the measurement data set may be stored in the transaction database by a register protocol (which is one of the second protocols). In another preferred step 214, the method comprises the retrieval of measurement data included in the measurement data set by at least one third protocol, for which a retrieval function provided in the register protocol is called up by the at least one third protocol.

In the optional step 216, the method may furthermore comprise a reception on the part of the meter and/or the processing unit comprised therein of data and/or instructions, which were sent by the first protocol. These data and/or instructions may by based on the measurement data set received from the first protocol or may be independent therefrom, i.e. they may relate to settings of the smart meter. The data and/or instructions may be evaluated and/or executed by the smart meter in a likewise optional step 218. The last two steps 216 and 218 (if provided) are not necessarily executed after the steps 202 through 208, but may be executed independently from each other also before or after any of the steps 202 through 208.

The present invention was described above in such a way that measurement data were combined to form a measurement data set. Of course, this shall not exclude that additional measurement data sets are formed, for which the method according to the present invention is carried out. For example, measurement data within predetermined periods of time may be combined to form respective measurement data sets, which then, at the end of the respective period of time, are each signed and transmitted to the first protocol. Additionally, a measurement data set may be respectively formed, signed and transmitted in response to corresponding request (i.e., an instruction in step 216) of the first protocol, it being possible for the measurement data set to comprise e.g., measurement data within a period of time indicated in the request or the measurement data newly obtained since the most recent previous request.

The invention claimed is:

1. A method for reliable provision of measurement data of at least one sensor of a smart meter in a decentralized transaction database, comprising the following steps:
   forming, by the smart meter, a measurement data set, which includes measurement data recorded by the at least one sensor of the smart meter at least at one period in time;
   digitally signing, by the smart meter, the measurement data set using a secret key;
   transmitting, by the smart meter, the digitally signed measurement data set from the smart meter to a first smart contract configured to be executed on the decentralized transaction database in automated fashion;

successfully verifying, by the first smart contract executing on the decentralized transaction database, the digitally signed measurement data set using a public key which corresponds to the secret key; and in response to the digitally signed measurement data set being successfully verified, providing, by the first smart contract executing on the decentralized transaction database, the measurement data set to at least one second smart contract configured to be executed on the decentralized transaction database in automated fashion.

2. The method according to claim 1, further comprising:
storing the measurement data set in the transaction database by a register smart contract, which is one of the at least one second smart contract.

3. The method according to claim 2, further comprising:
retrieving measurement data included in the measurement data set by one or multiple third smart contracts configured to be executed in automated fashion on the decentralized transaction database.

4. The method according to claim 3, wherein the register smart contract implements a retrieval function, which is called up by the one or the multiple third smart contracts, and upon being called up returns the measurement data contained in the measurement data set.

5. The method according to claim 1, further comprising:
transmitting, by the first smart contract, data and/or instructions to the meter;
receiving, by the meter, the transmitted data and/or instructions; and
executing settings, by the meter, based on the received data and/or executing the instructions.

6. The method according to claim 1, further comprising:
recording the measurement data by the at least one sensor.

7. The method according to claim 1, wherein a secure runtime environment is provided in the meter, in which the measurement data set is formed and digitally signed.

8. A smart meter system, comprising:
a smart meter including:
at least one sensor; and
a processing unit;
wherein the at least one sensor is configured to record measurement data, and
the processing unit is configured to: (i) form a measurement data set, which includes the measurement data recorded at least at one point in time by the at least one sensor, (ii) digitally sign the measurement data set using a private key, and (iii) transmit the signed measurement data set from the smart meter to a first smart contract configured to be executed in automated fashion on a decentralized transaction database; and wherein the first smart contract is configured to verify the digitally signed measurement data set using a public key which corresponds to the private key; and provide, in response to the digitally signed measurement data set being successfully verified, the measurement data set to at least one second smart contract configured to be executed on the decentralized transaction database in automated fashion.

9. The smart meter according to claim 8, wherein the processing unit is further configured to provide a secure runtime environment in which the forming, digital signing, and transmitting are executed which the processing unit is configured to execute.

10. The smart meter according to claim 8, wherein the smart meter is configured to receive data and/or instructions from the first smart contract, the processing unit further being configured to perform settings based on the received data and/or to execute the instructions.

11. A non-transitory machine-readable storage medium on which is stored a computer program for reliable provision of measurement data of at least one sensor of a smart meter in a decentralized transaction database, the computer program, when executed by a computer, causing the computer to perform the following steps:

forming, by the smart meter, a measurement data set, which includes measurement data recorded by the at least one sensor of the smart meter at least at one period in time;

digitally signing, by the smart meter, the measurement data set using a secret key;

transmitting, by the smart meter, the digitally signed measurement data set from the smart meter to a first smart contract configured to be executed on the decentralized transaction database in automated fashion;

successfully verifying, by the first smart contract executing on the decentralized transaction database, the digitally signed measurement data set using a public key which corresponds to the secret key; and in response to the digitally signed measurement data set being successfully verified, providing, by the first smart contract executing on the decentralized transaction database, the measurement data set to at least one second smart contract configured to be executed on the decentralized transaction database in automated fashion.

* * * * *